Patented May 10, 1932

1,858,220

UNITED STATES PATENT OFFICE

LEO SCHLECHT AND EMIL KEUNECKE, OF LUDWIGSHAFEN-ON-THE-RHINE, AND WALTER SCHUBARDT, OF MANNHEIM, GERMANY, ASSIGNORS TO I. G. FARBENINDUSTRIE AKTIENGESELLSCHAFT, OF FRANKFORT-ON-THE-MAIN, GERMANY, A CORPORATION OF GERMANY

PRODUCTION OF METAL CARBONYLS

No Drawing. Application filed May 18, 1929, Serial No. 364,319, and in Germany May 23, 1928.

The present invention relates to the production of metal carbonyls from initial material containing the corresponding metals in a combined state.

Hitherto the metals required for treatment with carbon monoxide to form metal carbonyls have been prepared from metallic compounds at the lowest possible temperature, for example by reduction of metallic oxides at from 300° to 500° C.

In carrying out the reduction at low temperatures important technical drawbacks are encountered in contrast with reduction at higher temperatures, such for example as 900° C., namely the slowness of the reaction and the large quantity of gaseous reducing agent necessary. If, on the other hand the metal is produced more simply and economically by reduction at higher temperatures, it loses in consequence most of its activity towards carbon monoxide, and hence but small yields of carbonyl are obtained.

We have now found that metals having an excellent activity with reference to carbon monoxide are obtained even when operating at higher temperature, for example above 500° C. or even at temperatures which need not be far from the melting point of the metal to be prepared, and consequently with greater velocities of reaction, by intimately mixing the initial materials from which the metal for preparing carbonyls is to be obtained, with substances which prevent sintering in the subsequent treatment, in particular in the reduction of oxidic initial materials. Frequently quite small additions of the said substances are sufficient to produce remarkable results. Among suitable substances which may be added, compounds of alkali metals, alkaline earth metals and earth metals, for example, prove particularly suitable. Substances preventing sintering may also be incorporated with the material containing the metals to be converted into carbonyls as oxides by effecting the reduction of the initial material by means of solid or liquid carbonaceous or carbonizable reducing agents rich in ashes. In this case the ashes prevent sintering during reduction. Reducing agents of the said kind are, for example, lignite and its low-temperature carbonization products, semi-coke, coal rich in ashes, oil-shale, asphalt- and pitch-like residues of the oil and tar industry, tarry and oily residues obtained by the destructive hydrogenation of carbonaceous material and the like. Reducing agents particularly suitable for the purpose of the present invention are those the ashes of which contain only small amounts of slag forming constituents and consist mainly of substances such as lime, gypsum, alumina, magnesia and the like. Preferably the material to be reduced and the aforesaid reducing agents are intimately mixed, if desired while adding the reducing agents low in ashes, and effecting reduction by heating the mixture in a revolving furnace or in the form of briquettes in a shaft furnace to which reducing gases may be supplied to assist reduction.

Carbonaceous material and easily carbonizable substances having a low content of ashes and also such as are free from ashes may be used to prevent sintering, but in this case the reduction is to be carried out in such a manner that the reduced material still contains carbon either by effecting reduction by means of a surplus of carbon or by assisting reduction by means of reducing gases.

The substances preventing sintering may be mixed with the initial material in any known manner. When the said substances are soluble in water or can easily be suspended therein mixing may be performed by drenching the initial materials with a solution or suspension of the addition substances.

The substances preventing sintering may either remain in the reduced material or may be partly or wholly removed before converting the metals into their carbonyls. Thus, when effecting reduction with the aid of carbonaceous material rich in ashes the reduced material may be separated from the ashes and carbonaceous material not consumed in the reduction treatment in any known manner, for example by means of a magnetic separator.

The process is of special advantage for the manufacture and production of carbonyls of metals which can only be reduced at relatively high temperatures, for example for the production of molybdenum carbonyl. The results produced by additions of the said substances prove particularly favorable when the production of the carbonyls is carried out with a relatively low pressure of carbon monoxide, for example about 20 atmospheres.

The following examples will further illustrate how the invention is carried out in practice, but the invention is not restricted thereto.

*Example 1*

Roasted pyrites which has been drenched with a 10 per cent solution of magnesium sulphate is reduced by means of hydrogen at 800° C. By treatment at 200° C. with carbon monoxide under a pressure of 200 atmospheres, 94.1 per cent of the iron in the pyrites is converted into iron carbonyl in about 6 hours. Without such previous treatment of the pyrites with a solution of magnesium sulphate the other conditions being equal less than half of the iron is converted into carbonyl.

*Example 2*

Roasted pyrites is reduced by heating it in admixture with charcoal for 5 hours at 1000° C. The amount of added charcoal is so calculated that after reduction the material still contains 2.8 per cent of carbon. By treating the material for 6 hours with carbon monoxide under a pressure of 180 atmospheres at 175° C. 93 per cent of the theoretical yield of iron carbonyl is obtained.

*Example 3*

Equal parts of fine-grained roasted pyrites with an iron content of 55 per cent and products of the low-temperature carbonization of lignites containing 20 per cent of ashes are mixed and passed through a revolving furnace preheated to 900° C. The furnace is operated with additional firing only when starting afterwards it is sufficient for maintaining the said temperature to burn part of the carbonaceous material by introducing air into the furnace. The reduced material leaves the furnace with a surplus of carbon and passes through an externally cooled tube. After cooling, the reduced material is separated from the carbonaceous material, ashes and gangue by means of a magnetic separator. The carbonaceous material may be recovered by a further separation from the ashes and gangue.

More than 80 per cent of the iron contained in the reduced material are converted into iron carbonyl in a short time by a treatment with carbon monoxide under pressure.

What we claim is:

1. The process of forming metal carbonyls from materials containing the carbonyl forming metals which comprises intimately mixing the said materials with substances preventing sintering under the subsequent conditions of reduction and reducing the materials at a temperature above 500° C., but below the melting point of said metals to obtain the same in an unsintered condition and then treating the reduced materials with carbon monoxide to form the metal carbonyls.

2. The process of forming metal carbonyls from materials containing the carbonyl forming metals which comprises intimately mixing the said materials with carbonaceous material rich in ashes and effecting reduction of the said materials at a temperature above 500° C., but below the melting point of said metals, the ashes in said carbonaceous material preventing sintering of said metal containing materials and then treating the reduced metal containing materials with carbon monoxide to form the metal carbonyls.

3. The process as defined in claim 2 wherein said carbonaceous material contains about 20 per cent of ashes.

4. The process as claimed in claim 2 wherein at least part of the ashes is removed from the reduced material prior to the carbonyl forming step.

5. The process of forming iron carbonyl from roasted pyrites which comprises reducing said roasted pyrites at a temperature of about 900° C. with a carbonaceous material containing about 20 per cent of ashes while said carbonaceous material is intimately mixed with said roasted pyrites, the ashes in said carbonaceous material preventing sintering of said roasted pyrites and then treating the reduced material with carbon monoxide to form iron carbonyl.

6. The process as defined in claim 1 wherein the metal containing starting material is roasted pyrites, the substance employed to prevent sintering is magnesium sulfate, and the reduction is effected with hydrogen at a temperature of about 800° C.

In testimony whereof we have hereunto set our hands.

LEO SCHLECHT.
EMIL KEUNECKE.
WALTER SCHUBARDT.